Aug. 29, 1933.  A. L. FREEDLANDER  1,924,354
BELT
Filed April 16, 1931  2 Sheets-Sheet 1

INVENTOR
Abraham L. Freedlander
BY Toulmin & Toulmin
ATTORNEY

Aug. 29, 1933.  A. L. FREEDLANDER  1,924,354
BELT
Filed April 16, 1931  2 Sheets-Sheet 2
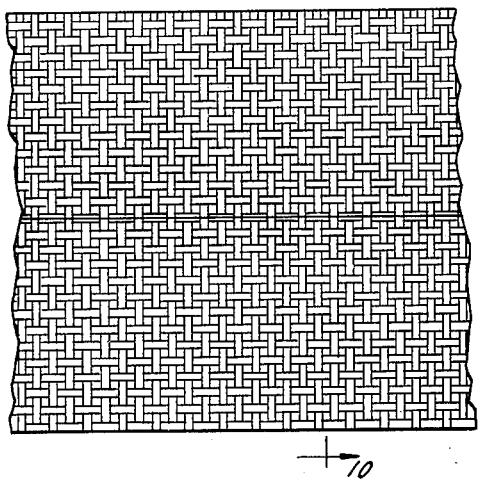
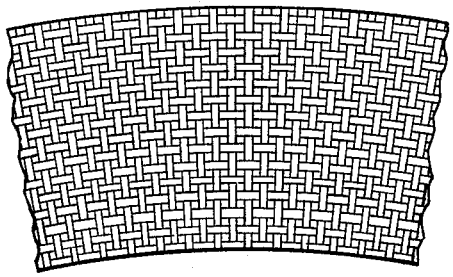
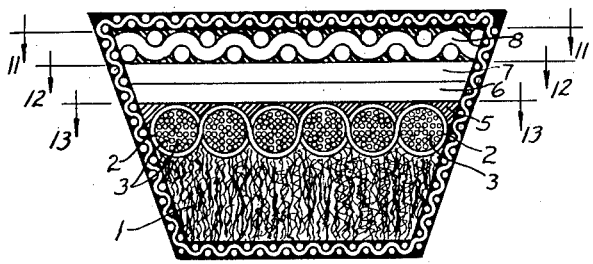
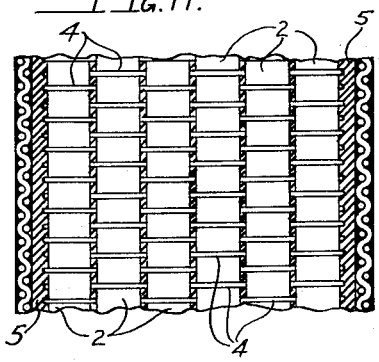
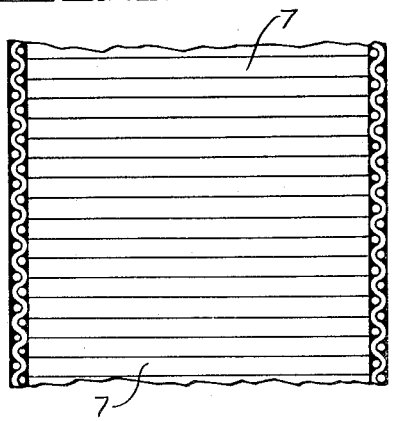
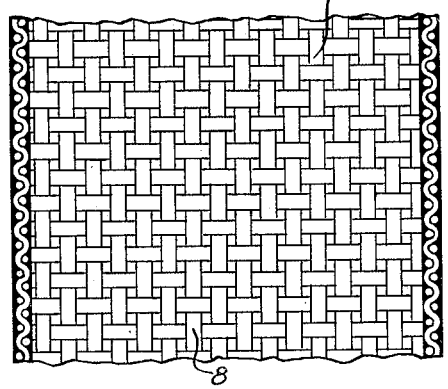

Patented Aug. 29, 1933

1,924,354

UNITED STATES PATENT OFFICE 1,924,354

BELT

Abraham L. Freedlander, Dayton, Ohio

Application April 16, 1931. Serial No. 530,537

4 Claims. (Cl. 74—63)

My invention relates to belts.

It is the object of my invention to provide a very rigid belt, which is rigid against transverse and longitudinal compression and extension but in which the backbone or neutral axis of the belt lies in the single layer of cords of very large section which are maintained in parallel alignment and are wound upon the belt.

It is also within the scope of my invention to wind the cord layer spirally on the belt, but either the winding of the cord fabric or the independent cord may be employed.

It is my object to provide a belt with a straight laid wrapper, that is, a wrapper in which the axis of one part of the threads is parallel to the longitudinal axis of the belt and the other threads at right angles thereto.

It is a further object to provide such a wrapped belt using straight laid fabric not only in the wrapper but also in the belt itself that will be fully flexible will not buckle and will give all the advantages of a bias-laid fabric but with a cheaper and more easily handled straight laid fabric particularly as a wrapper.

It is my object to provide low temperature vulcanization below the critical temperature of the fabric composing the belt to prevent burning of the fabric or deterioration thereof and to combine with such fabric a non-revertible rubber containing a very fast acceleration with a very low percentage of sulphur.

I am thus enabled to get a rubber which, under heat, does not revert to a sticky condition, a rubber in which a low temperature of vulcanization is possible so that the fabric is not injured during vulcanization, and a belt, which, because of its low modulus, non-revertible characteristics, will permit of the use of a straight laid wrapper or straight laid material composing a part of the belt.

It is a further object to provide a belt in which the very large cords constituting the neutral axis make it possible to provide sufficient structural strength in the compression and tension sections that such sections may be used interchangeably.

It is a further object to provide a belt in which the wrapper characteristics described may be formed of cords arranged transversely of the longitudinal axis of the belt.

Referring to the drawings:

Figure 8 is a top plan view of a straight laid wrapper belt employing the construction of this invention;

Figure 9 is a side elevation thereof;

Figure 10 is a section on the line 10—10 of Figure 8;

Figure 11 is a section on the line 11—11 of Figure 10;

Figure 12 is a section on the line 12—12 of Figure 10;

Figure 13 is a section on the line 13—13 of Figure 10;

Figure 1:
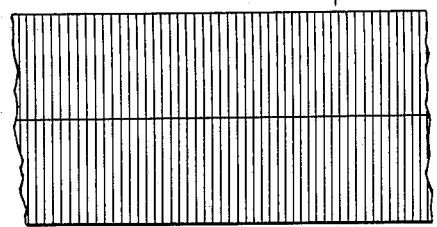
Figure 1 is a top plan view of the belt employing a cord wrapper.
Figure 2:
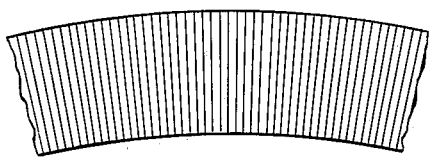
Figure 2 is a side elevation thereof.

Referring to the drawings in detail, the belt is composed of a section which may be used either as a compression or tension section formed of rubber and fine fiber, as at 1, although rubber alone may be employed. I use non-revertible rubber secured by the employment of a very fast acceleration in combination with a very low percentage of sulphur, that is, about three percent by weight of sulphur to the weight of rubber. I employ a cure of approximately 260 degrees, which is well below the critical temperature of the fabric, both in the belt and in the rubber. I employ the same type of rubber for impregnating the wrapper.

Wound either as a single cord or as a plurality of cords held together in alignment, I provide the cord elements 2 which are composed of a plurality of strands 3 forming relatively large heavy independent cord members that are wound spirally parallel to one another on the rubber element 1. If the cords compose a cord fabric held together by the threads 4, then the fabric will be laid on the rubber 1 with the cords 2 substantially parallel to the axis of the belt and parallel to one another. Thus, I form a belt composed of a plurality of homogeneous independent cord members. I thus secure sufficient strength transversely and longitudinally but avoid the buckling incident to having a plurality of layers of cords arranged longitudinally of the belt.

A layer of rubber 5 covers these cords and is interspersed between them to form a resilient bed and friction absorbing medium for these large cords. I then lay two layers of transversely arranged cord members 6 and 7 on top of the rubber 5 and maintain these cord members in position by the use of a rubber impregnated straight laid fabric layer 8 that is as fully resilient as the layer 1.

It will be noted that the cords 2 are arranged centrally of the belt. It does not make any difference whether the structural members 6, 7 and 8 are above or below the neutral axis layer of cords 2. The rubber having the fiber as at 1 is of the same resiliency substantially as the section composed of the layers 6, 7 and 8.

Figure 7:
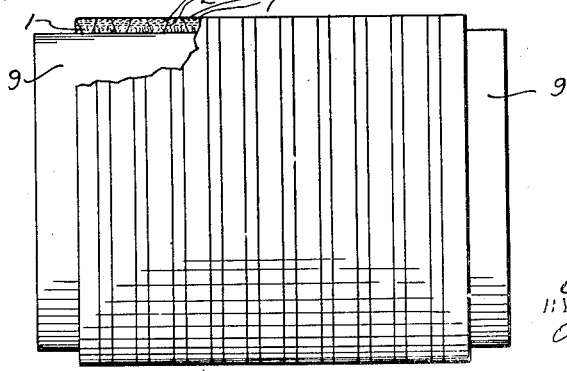
Figure 7 is an elevation of the belt material wound on a drum showing the lines of severance of the belt material into individual belts, a portion of the belt material being broken away and shown in section.

This material heretofore described is laid upon the supporting drum or mandrel 9. Due to the fact that the neutral axis 2 is equidistant from the top and bottom, I am enabled to cut the belt material into trapezoid sections as indicated in Figure 7 without waste of material.

Figure 3:
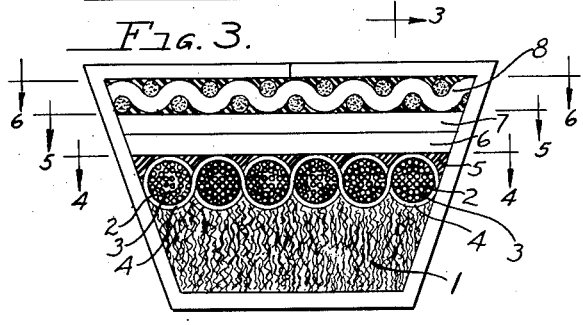
Figure 3 is a section on the line 3—3 of Figure 1.
Figure 4:
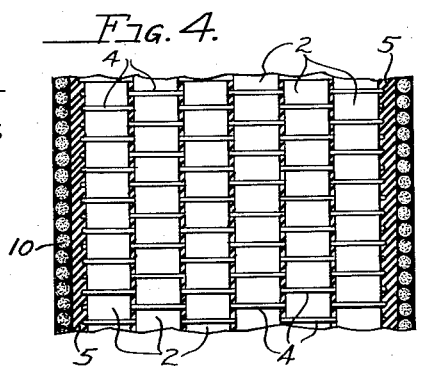
Figure 4 is a section on the line 4—4 of Figure 3.
Figure 5:
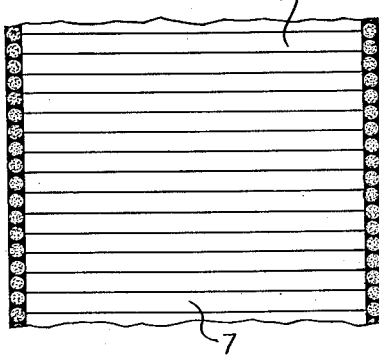
Figure 5 is a section on the line 5—5 of Figure 3.
Figure 6:
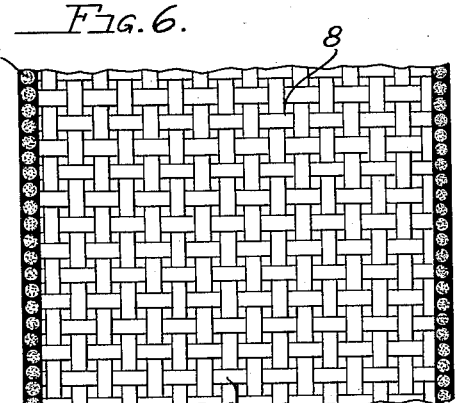
Figure 6 is a section on the line 6—6 of Figure 3.

The extreme flexibility of the material makes it possible to utilize the belts no matter whether the section 1 is the compression or tension section, although I prefer to use the belt in the form shown in Figure 3, for instance.

After the belts have been cut, I provide a wrapper of cords 10—10 arranged transversely to the longitudinal axis of the belt, which cords are impregnated with a rubber skim of the same type of very soft, non-revertible, low modulus rubber heretofore referred to.

The cords so arranged permit of easy flexing of the belt as it passes over short center drives of small pulleys, while, at the same time, due to the cord structure, long life is given to the belt and sufficient transverse rigidity.

It is a further advantage in that the cords provide large heat radiating members which transmit heat from the internal cord and fabric construction heretofore referred to. This heat is generated during operation in the usual manner and must be removed from the belt as rapidly as possible and effectively as possible in order to increase the life of the belt.

I also provide, as shown in Figures 8 to 13, a belt with a wrapper of straight laid fabric impregnated with rubber, in which a part of the cords run parallel to the longitudinal axis and a part of the cords run at right angles thereto.

This form of wrapper is cheaper and more easily handled than bias-laid fabric and will be fully flexible without buckling when used with my combination of a very flexible neutral axis, section so far as transverse bending is concerned, but laterally incompressible and longitudinally inextensible.

By use of the low modulus non-revertible rubber, I secure a very soft and flexible belt which permits of the use of these wrappers which hitherto have been unsuccessful.

It will be understood that I desire to comprehend within my invention such modifications as may be necessary to adapt it to varying conditions and uses.

Having thus fully described my invention, what I claim as new and desire to secure by Letters Patent, is:

1. In combination, a belt comprising a rubber compression section, a neutral axis section composed of a relatively large wound cord arranged in a single layer on the compression section, a layer of transverse cords on the neutral axis, and a layer of straight laid fabric on the transverse cords.

2. In combination, a belt comprising a rubber compression section, a neutral axis section composed of a relatively large wound cord arranged in a single layer on the compression section, a layer of transverse cords on the neutral axis, a layer of straight laid fabric on the transverse cords, and a wrapper for said belt comprising cords arranged transversely of the longitudinal axis of the belt, said cords being impregnated with rubber.

3. In combination, a belt comprising a rubber compression section, a neutral axis section composed of a relatively large wound cord arranged in a single layer on the compression section, a layer of transverse cords on the neutral axis, a layer of straight laid fabric on the transverse cords, and a wrapper for said belt comprising straight laid fabric impregnated with rubber.

4. In combination in a belt of a compression section composed of fibers and rubber, a single cord wound thereon of relatively large section comprising a plurality of woven strands, a plurality of superimposed, transversely arranged cord layers on the wound cord, a rubber impregnated layer of straight laid fabric on the cord layers, and a wrapper for the belt of rubber impregnated cords arranged transversely of the longitudinal axis of the belt.

ABRAHAM L. FREEDLANDER.